US009426447B2

(12) United States Patent
Lee et al.

(10) Patent No.: US 9,426,447 B2
(45) Date of Patent: Aug. 23, 2016

(54) APPARATUS AND METHOD FOR EYE TRACKING

(71) Applicant: Electronics and Telecommunications Research Institute, Daejeon (KR)

(72) Inventors: Hee Kyung Lee, Daejeon (KR); In Jae Lee, Daejeon (KR); Ji Hun Cha, Daejeon (KR); Whoi Yul Kim, Seoul (KR); Dong Chan Cho, Seoul (KR)

(73) Assignee: Electronics and Telecommunications Research Institute, Daejeon (KR)

( * ) Notice: Subject to any disclaimer, the term of this patent is extended or adjusted under 35 U.S.C. 154(b) by 296 days.

(21) Appl. No.: 14/049,673

(22) Filed: Oct. 9, 2013

(65) Prior Publication Data

US 2014/0098198 A1 Apr. 10, 2014

(30) Foreign Application Priority Data

Oct. 9, 2012 (KR) .................. 10-2012-0111702
Aug. 9, 2013 (KR) .................. 10-2013-0094997

(51) Int. Cl.
*H04N 13/00* (2006.01)
*H04N 13/02* (2006.01)
*G06F 3/01* (2006.01)

(52) U.S. Cl.
CPC .......... *H04N 13/0246* (2013.01); *G06F 3/013* (2013.01)

(58) Field of Classification Search
CPC .. A61B 3/113; A61B 3/145; G06K 9/00604; G06K 9/00597; G06K 9/00; G06K 9/00268; H04N 5/23219; H04N 7/14; H04N 7/141; H04N 7/18; H04N 13/00; G06F 3/013; G06F 3/00; G06F 3/033; G06F 3/014; G08B 21/00; G08B 21/06
See application file for complete search history.

(56) References Cited

U.S. PATENT DOCUMENTS

| 5,859,921 | A | * | 1/1999 | Suzuki | G08B 21/06 382/118 |
| 6,198,485 | B1 | * | 3/2001 | Mack | G06F 3/013 345/156 |
| 2007/0115349 | A1 | * | 5/2007 | Currivan | H04N 7/141 348/14.08 |
| 2010/0053555 | A1 | * | 3/2010 | Enriquez | A61B 3/113 351/210 |
| 2011/0279666 | A1 | * | 11/2011 | Strombom | G06K 9/00604 348/78 |

OTHER PUBLICATIONS

Ohno et al. A free-head, simple calibration, gaze tracking system that enables gazebased interaction, Eye Tracking Research & Applications, pp. 115-122. 2004.*

(Continued)

*Primary Examiner* — Jay Patel
*Assistant Examiner* — Frank Huang
(74) *Attorney, Agent, or Firm* — William Park & Associates Ltd.

(57) ABSTRACT

A gaze tracking apparatus and method are provided that may calculate a three-dimensional (3D) position of a user using at least two wide angle cameras, may perform panning, tilting, and focusing based on position information of the user and eye region detection information, using a narrow angle camera, may detect pupil center information and corneal reflected light information from an eye image acquired through an operation of the narrow angle camera, and may finally calculate gaze position information from the pupil center information and the corneal reflected light information.

14 Claims, 17 Drawing Sheets

(56) References Cited

OTHER PUBLICATIONS

Beymer et al. Beymer et al. Eye gaze tracking using an active stereo head. In Proceedings of Computer Vision and Pattern Recognition, vol. 2, 451-458. eye tracking, head-free, active camera. 2003.*

Dong Hyun Yoo et al, "A novel non-intrusive eye gaze estimation using cross-ratio under large head motion," Computer Vision and Image Understanding, Apr. 2005, pp. 25-51, vol. 98, Issue 1, Elsevier Inc.

Hyeon Chang Lee et al., "Gaze Tracking System at a Distance for Controlling IPTV," IEEE, Nov. 2010, pp. 2577-2583, vol. 56, Issue 4, IEEE.

Craig Hennessey et al., "Long Range Eye Tracking: Bringing Eye Tracking into the Living Room," 2012, pp. 249-252., Association for Computing Machinery Inc.

Zhiwei Zhu et al., "Novel Eye Gaze Tracking Techniques Under Natural Head Movement," IEEE Transactions on Biomedial Engineering, Dec. 2007, pp. 2246-2260, vol. 54, Issue 12, IEEE.

* cited by examiner

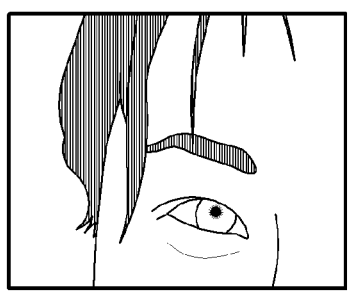 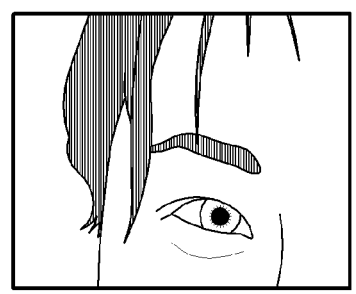
FIG. 7

FIG. 8

| $b_1$ | $b_2$ | $b_3$ | $b_4$ | $b_5$ | $b_6$ | $b_7$ |
|---|---|---|---|---|---|---|
| $b_{24}$ | | | | | | $b_8$ |
| $b_{23}$ | | | | | | $b_9$ |
| $b_{22}$ | | | c | | | $b_{10}$ |
| $b_{21}$ | | | | | | $b_{11}$ |
| $b_{20}$ | | | | | | $b_{12}$ |
| $b_{19}$ | $b_{18}$ | $b_{17}$ | $b_{16}$ | $b_{15}$ | $b_{14}$ | $b_{13}$ |

FIG. 10
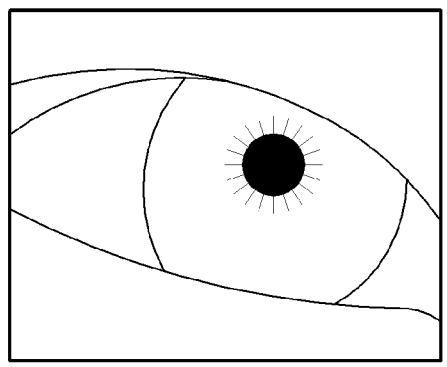
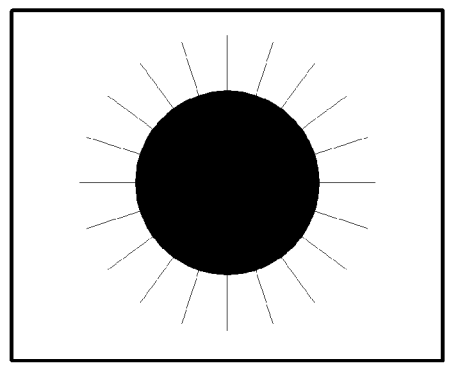

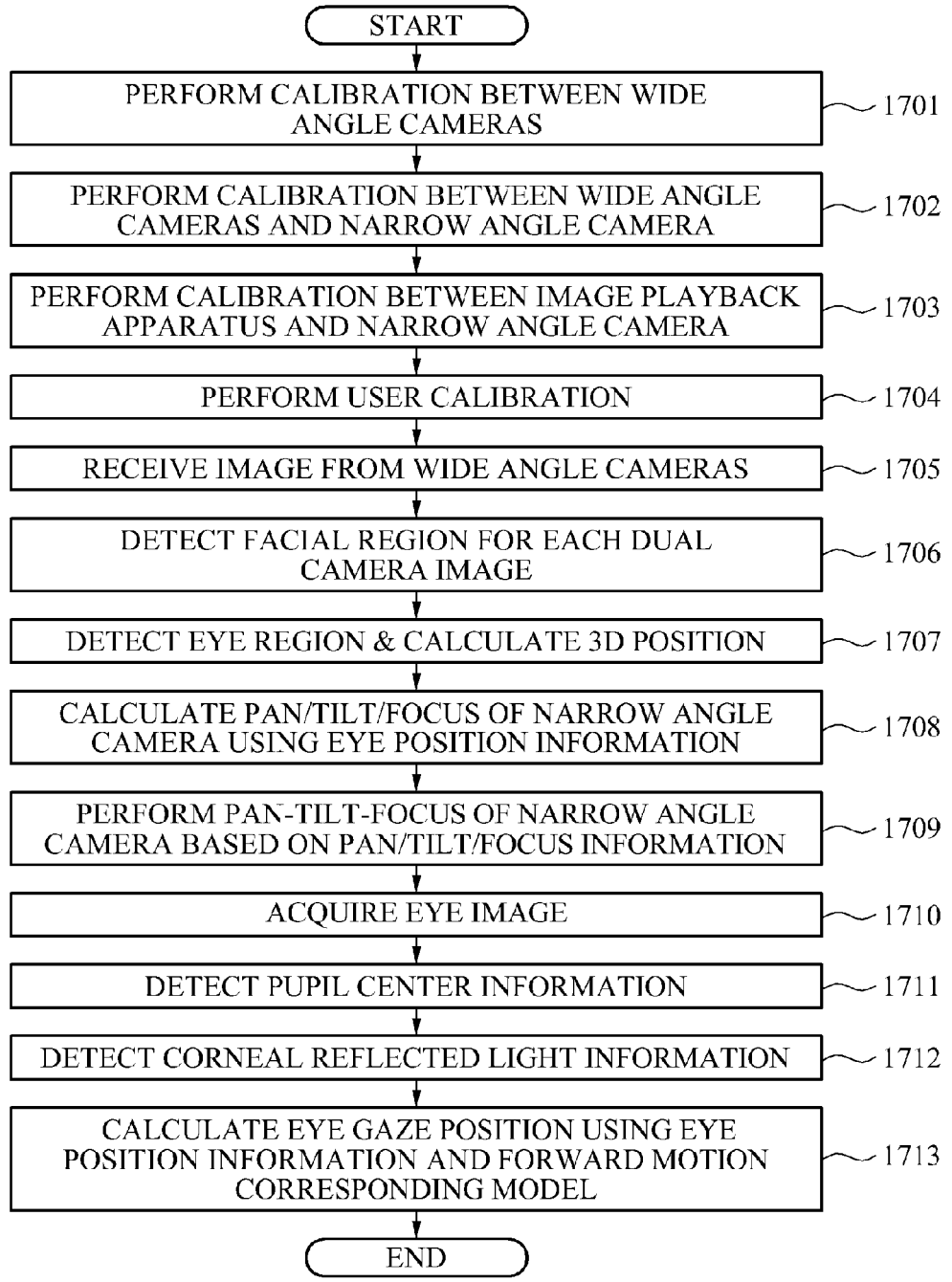

APPARATUS AND METHOD FOR EYE TRACKING

CROSS-REFERENCE TO RELATED APPLICATIONS

This application claims the benefit of Korean Patent Application No. 10-2012-0111702 and of Korean Patent Application No. 10-2013-0094997, respectively filed on Oct. 9, 2012 and Aug. 9, 2013, in the Korean Intellectual Property Office, the disclosures of which are incorporated herein by reference.

BACKGROUND

1. Field of the Invention

The present invention relate to a gaze tracking apparatus and method for acquiring accurate gaze information even when a user freely moves at a distance.

2. Description of the Related Art

To detect an eye gaze position in a gaze tracking technology, two-dimensional (2D) mapping function-based methods, and three-dimensional (3D) model-based methods may be used.

A part of 3D model-based methods may require complex system calibration, despite free movement of a user being guaranteed. Additionally, a distance between a user and a screen may be less than 1 meter (m).

2D mapping function-based methods may be used to track an eye gaze in a long distance, as well as, in a short distance, and may not require complex system calibration. However, when a user moves from a position in which user calibration is performed, a large error in an eye gaze position may occur.

Accordingly, there is a desire for development of a technology to reduce an eye gaze position error caused by free movement of a user, and to provide accurate gaze tracking information, in a remote gaze tracking technology.

SUMMARY

According to an aspect of the present invention, there is provided a gaze tracking apparatus including: a calibration performing unit to perform calibration between at least two wide angle cameras, a narrow angle camera, and an image playback apparatus, and to calculate user position information associated with a user; an image information input unit to receive input of image information through the at least two wide angle cameras; a first information detector to detect eye position information from the image information; an image acquiring unit to acquire an eye image by performing panning, tilting, and focusing of the narrow angle camera, based on the eye position information and the user position information; a second information detector to detect pupil center information regarding a center of a pupil from the eye image; a third information detector to detect corneal reflected light information regarding corneal reflected light reflected from an eye of the user; and a gaze position calculating unit to calculate gaze position information from the pupil center information and the corneal reflected light information.

The calibration performing unit may perform calibration between the at least two wide angle cameras, may perform calibration between the at least two wide angle cameras and the narrow angle camera, and may perform calibration between the narrow angle camera and the image playback apparatus.

The first information detector may detect a facial region and an eye region, based on at least two pieces of image information.

When the user moves from a position in which calibration is performed between the at least two wide angle cameras, the gaze position calculating unit may correct the user position information by applying the user position information to a forward motion correction model, and may calculate the gaze position information based on the corrected user position information.

According to another aspect of the present invention, there is provided a gaze tracking apparatus, including: at least two wide angle cameras to receive input of image information, and to calculate user position information associated with a user through calibration; a narrow angle camera to perform panning, tilting, and focusing, using the user position information and eye region detection information; an image acquiring unit to acquire an eye image through an operation of the narrow angle camera; a detector to detect pupil center information and corneal reflected light information from the eye image; and a gaze position calculating unit to calculate gaze position information from the pupil center information and the corneal reflected light information.

The gaze tracking apparatus may further include a calibration performing unit to perform calibration between the at least two wide angle cameras.

The calibration performing unit may estimate, based on a wide angle camera, a degree of rotation and a position of another camera using a stereo calibration scheme.

The calibration performing unit may perform calibration between the at least two wide angle cameras and the narrow angle camera.

The calibration performing unit may perform calibration between the narrow angle camera and an image playback apparatus.

The calibration performing unit may estimate a difference with an actual position of the image playback apparatus based on a center of a tilt axis and a pan axis in which the narrow angle camera moves.

The gaze position calculating unit may calculate the gaze position information through a forward motion correction model used to correct an eye gaze position based on movement of the user.

The image acquiring unit may include a resolution adjusting unit to adjust a resolution of the image information, a reflected light eliminating unit to eliminate reflected light of the image information with the adjusted resolution, and a pupil candidate region detector to detect a pupil candidate region by applying a preset filter to the image information from which the reflected light is eliminated.

The image acquiring unit may further include a region selecting unit to select two regions with different sizes from the pupil candidate region, a threshold detector to detect two thresholds of the two regions, and an image determining unit to determine that an eyelid image is not included in the eye image, when the two detected thresholds are determined to be the same.

The image acquiring unit may further include a pupil center detector to detect circle information from the pupil candidate region, to perform ellipse fitting on the detected circle information, and to detect the pupil center information.

The pupil center detector may include a circle detector to distinguish a center of a circle from an outline of the circle by applying a circle detection scheme, in the pupil candidate region, a position selecting unit to select a plurality of points for the outline of the circle, a position moving unit to move the plurality of selected points to a position with a largest differential value for an intensity value in a straight line connecting the plurality of selected points to the center of the circle, a weight applying unit to apply a weight to the plurality of moved points, based on a differential value, and an ellipse fitting unit to perform ellipse fitting using the plurality of points to which the weight is applied, and to detect pupil center information.

The image acquiring unit may calculate a pan angle and a tilt angle used to capture the user using the narrow angle camera, based on a three-dimensional (3D) position of the user.

The image acquiring unit may include a first estimator to estimate two-dimensional (2D) coordinates of a virtual image corresponding to the pan angle and the tilt angle, a second estimator to estimate virtual coordinates obtained by reflecting 3D coordinates of the 3D position on the virtual image, based on a relative position relationship between the 2D coordinates and the 3D coordinates, and a third estimator to estimate the pan angle and the tilt angle, based on the virtual coordinates.

The gaze tracking apparatus may further include an image correcting unit to correct an error in gaze position information that is caused by a shaken pupil of the user.

According to still another aspect of the present invention, there is provided a gaze tracking method including: performing calibration between at least two wide angle cameras, a narrow angle camera, and an image playback apparatus, and calculating user position information associated with a user; receiving input of image information through the at least two wide angle cameras; detecting eye position information from the image information; acquiring an eye image by performing panning, tilting, and focusing of the narrow angle camera, based on the eye position information and the user position information; detecting pupil center information regarding a center of a pupil from the eye image; detecting corneal reflected light information regarding corneal reflected light reflected from an eye of the user; and calculating gaze position information from the pupil center information and the corneal reflected light information.

According to yet another aspect of the present invention, there is provided a gaze tracking method, including: receiving input of image information through at least two wide angle cameras; calculating user position information associated with a user using the at least two wide angle cameras; performing panning, tilting, and focusing, using a narrow angle camera, based on the user position information and eye region detection information; acquiring an eye image through an operation of the narrow angle camera; detecting pupil center information and corneal reflected light information from the eye image; and calculating gaze position information from the pupil center information and the corneal reflected light information.

BRIEF DESCRIPTION OF THE DRAWINGS

These and/or other aspects, features, and advantages of the invention will become apparent and more readily appreciated from the following description of exemplary embodiments, taken in conjunction with the accompanying drawings of which:

FIG. 7 is a diagram illustrating an example of elimination of reflected light according to an embodiment of the present invention;

FIG. 8 is a diagram illustrating an example of applying a detection filter for a pupil candidate region according to an embodiment of the present invention;

FIG. 10 is a diagram illustrating an example of a large candidate region and a small candidate region adjacent to a pupil according to an embodiment of the present invention;

FIG. 17 is a flowchart illustrating a gaze tracking method according to an embodiment of the present invention.

DETAILED DESCRIPTION

Figure 1:
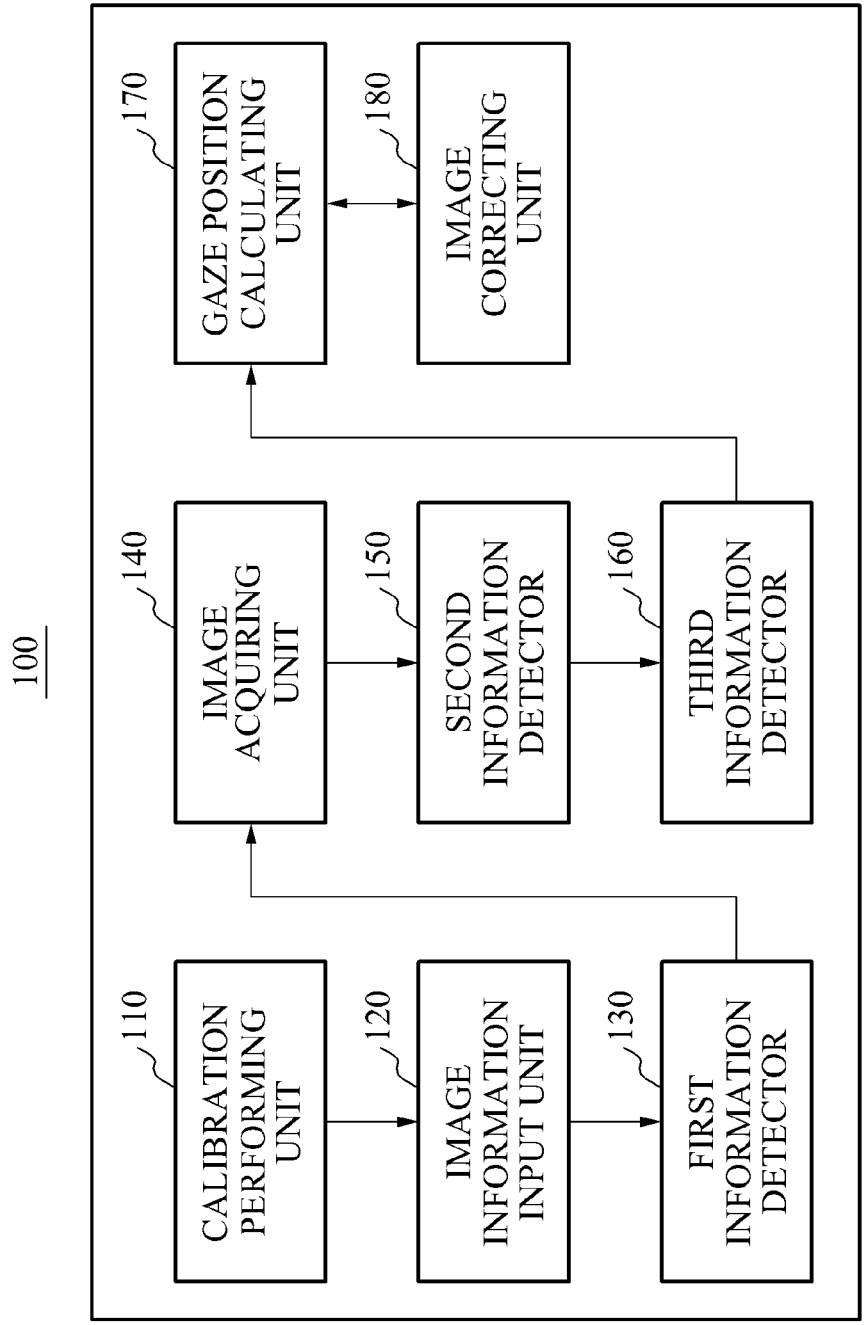
FIG. 1 is a block diagram illustrating a configuration of a gaze tracking apparatus according to an embodiment of the present invention.

Reference will now be made in detail to exemplary embodiments of the present invention, examples of which are illustrated in the accompanying drawings, wherein like reference numerals refer to the like elements throughout. Exemplary embodiments are described below to explain the present invention by referring to the figures.

FIG. 1 is a block diagram illustrating a configuration of a gaze tracking apparatus 100 according to an embodiment of the present invention.

Referring to FIG. 1, the gaze tracking apparatus 100 may include a calibration performing unit 110, an image information input unit 120, a first information detector 130, an image acquiring unit 140, a second information detector 150, a third information detector 160, and a gaze position calculating unit 170.

The calibration performing unit 110 may perform calibration between at least two wide angle cameras, a narrow angle camera, and an image playback apparatus, and may calculate user position information associated with a user. For example, the calibration performing unit 110 may perform calibration between the at least two wide angle cameras, may perform calibration between the at least two wide angle cameras and the narrow angle camera, and may perform calibration between the narrow angle camera and the image playback apparatus.

The image information input unit 120 may receive input of image information through the at least two wide angle cameras. The first information detector 130 may detect eye position information from the image information. For example, the first information detector 130 may detect a facial region and an eye region, based on at least two pieces of image information. The image acquiring unit 140 may acquire an eye image by performing panning, tilting, and focusing of the narrow angle camera, based on the eye position information and the user position information.

The second information detector 150 may detect pupil center information regarding a center of a pupil, from the eye image. The third information detector 160 may detect corneal reflected light information regarding corneal reflected light reflected from an eye of a user.

The gaze position calculating unit 170 may calculate gaze position information, based on the pupil center information and the corneal reflected light information. For example, when a user moves from a position in which calibration is performed between the at least two wide angle cameras, the gaze position calculating unit 170 may correct the user position information by applying the user position information to a forward motion correction model, and may calculate the gaze position information based on the corrected user position information.

The gaze tracking apparatus 100 may further include an image correcting unit 180. The image correcting unit 180 may correct an error of the gaze position information that is caused by a shaken pupil of a user.

Figure 2:
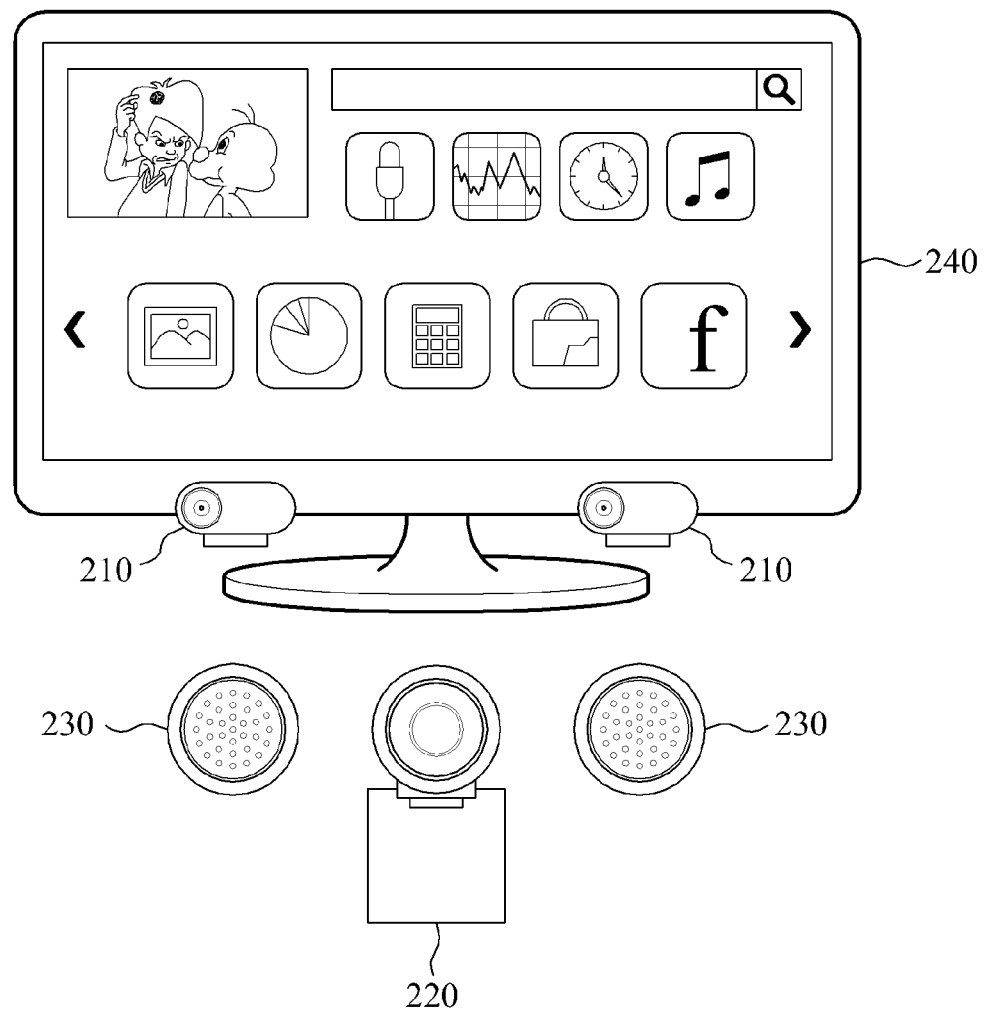
FIG. 2 is a diagram illustrating an application of a gaze tracking apparatus according to an embodiment of the present invention.

FIG. 2 is a diagram illustrating an application of a gaze tracking apparatus according to an embodiment of the present invention.

Referring to FIG. 2, the gaze tracking apparatus may include at least two wide angle cameras 210, a narrow angle camera 220, and at least two infrared lightings 230.

The gaze tracking apparatus of FIG. 2 may calculate a three-dimensional (3D) position of a user through calibration of the at least two wide angle cameras 210, and may perform panning, tilting and focusing of the narrow angle camera 220 using eye region detection information and position information of the user. Accordingly, the gaze tracking apparatus may acquire an eye image with a high quality, may detect pupil center information and lighting reflected light information from the acquired eye image, and may calculate gaze position information. The calculated gaze position information may be provided to an image playback apparatus 240, and the image playback apparatus 240 may play back an image corresponding to an eye gaze of the user.

Figure 3:
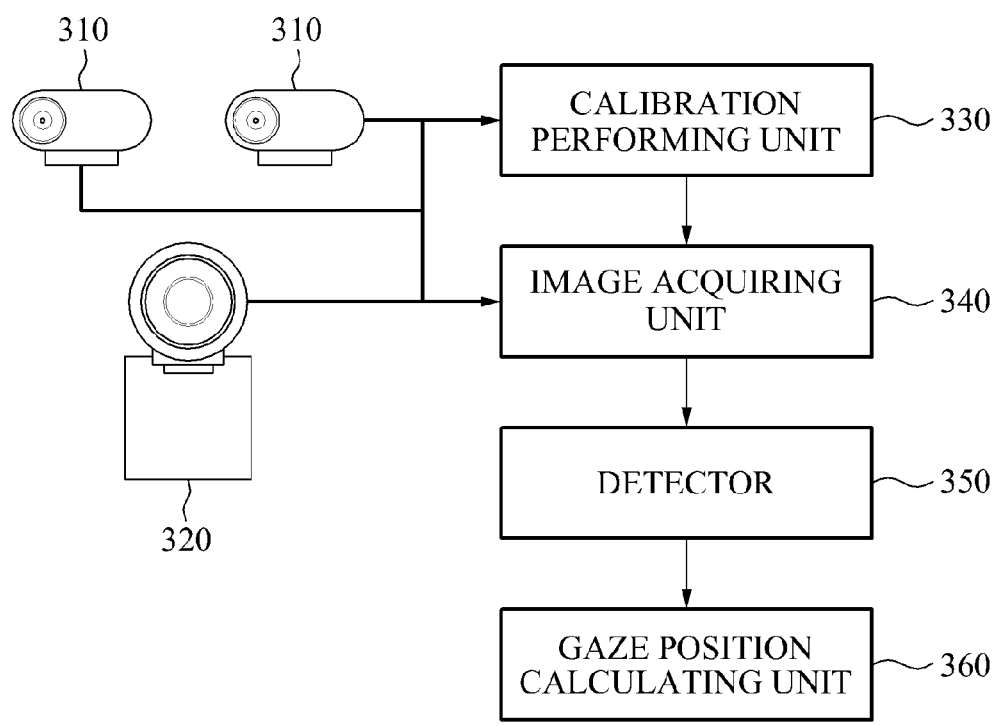
FIG. 3 is a diagram illustrating, in detail, a configuration of a gaze tracking apparatus according to an embodiment of the present invention.

FIG. 3 is a diagram illustrating, in detail, a configuration of a gaze tracking apparatus according to an embodiment of the present invention.

Referring to FIG. 3, the gaze tracking apparatus may include at least two wide angle cameras 310, a narrow angle camera 320, an image acquiring unit 340, a detector 350, and a gaze position calculating unit 360.

The at least two wide angle cameras 310 may receive input of image information, and may calculate a 3D position of a user through calibration. The narrow angle camera 320 may perform panning, tilting and focusing user position information and eye region detection information.

The image acquiring unit 340 may acquire an eye image through an operation of the narrow angle camera 320. The detector 350 may detect, from the eye image, pupil center information and corneal reflected light information. The gaze position calculating unit 360 may calculate gaze position information, based on the pupil center information and the corneal reflected light information.

The gaze position calculating unit 360 may calculate gaze position information using a forward motion correction model. The forward motion correction model may be used to correct an eye gaze position based on movement of a user.

Additionally, the gaze tracking apparatus may further include a calibration performing unit 330 to perform calibration between the at least two wide angle cameras 310, the narrow angle camera 320, and an image playback apparatus.

The calibration performing unit 330 may perform calibration between the at least two wide angle cameras 310. For example, the calibration performing unit 330 may estimate, based on a single wide angle camera, a degree of rotation and a position of another camera, using a stereo calibration scheme.

According to an embodiment of the present invention, for calibration between the at least two wide angle cameras 310, the gaze tracking apparatus may arrange check boards in several positions, may capture the check boards using two wide angle cameras (*the at least two wide angle cameras 310, and may perform calibration between the two wide angle cameras (*the at least two wide angle cameras 310 using the stereo calibration scheme.

Additionally, the calibration performing unit 330 may perform calibration between the at least two wide angle cameras 310 and the narrow angle camera 320. For example, the calibration performing unit 330 may calculate a pan angle and a tilt angle used to capture a user using the narrow angle camera 320, based on a 3D position of the user.

Figure 4:
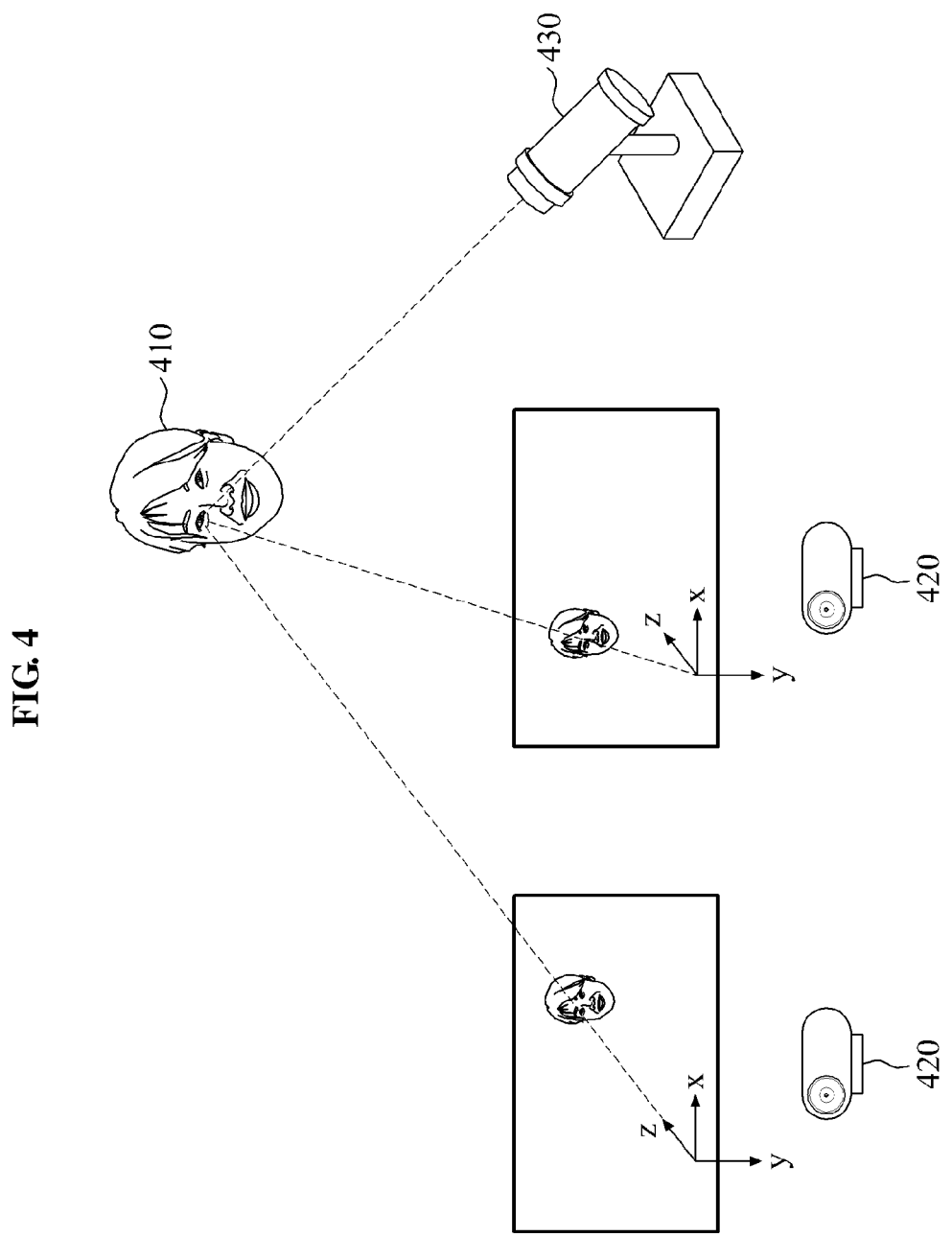
FIG. 4 is a diagram illustrating a concept of a calibration method of two wide angle cameras and a narrow angle camera.

FIG. 4 is a diagram illustrating a concept of a calibration method of two wide angle cameras and a narrow angle camera.

Referring to FIG. 4, a gaze tracking apparatus may perform calibration between wide angle cameras 420 and a narrow angle camera 430, to estimate position information and rotation information between the wide angle cameras 420 and the narrow angle camera 430.

In calibration between the wide angle cameras 420 and the narrow angle camera 430, panning and tilting may be performed in the narrow angle camera 430 to capture all check boards based on movement by a user 410. Accordingly, the narrow angle camera 430 may need to move.

Figure 5:
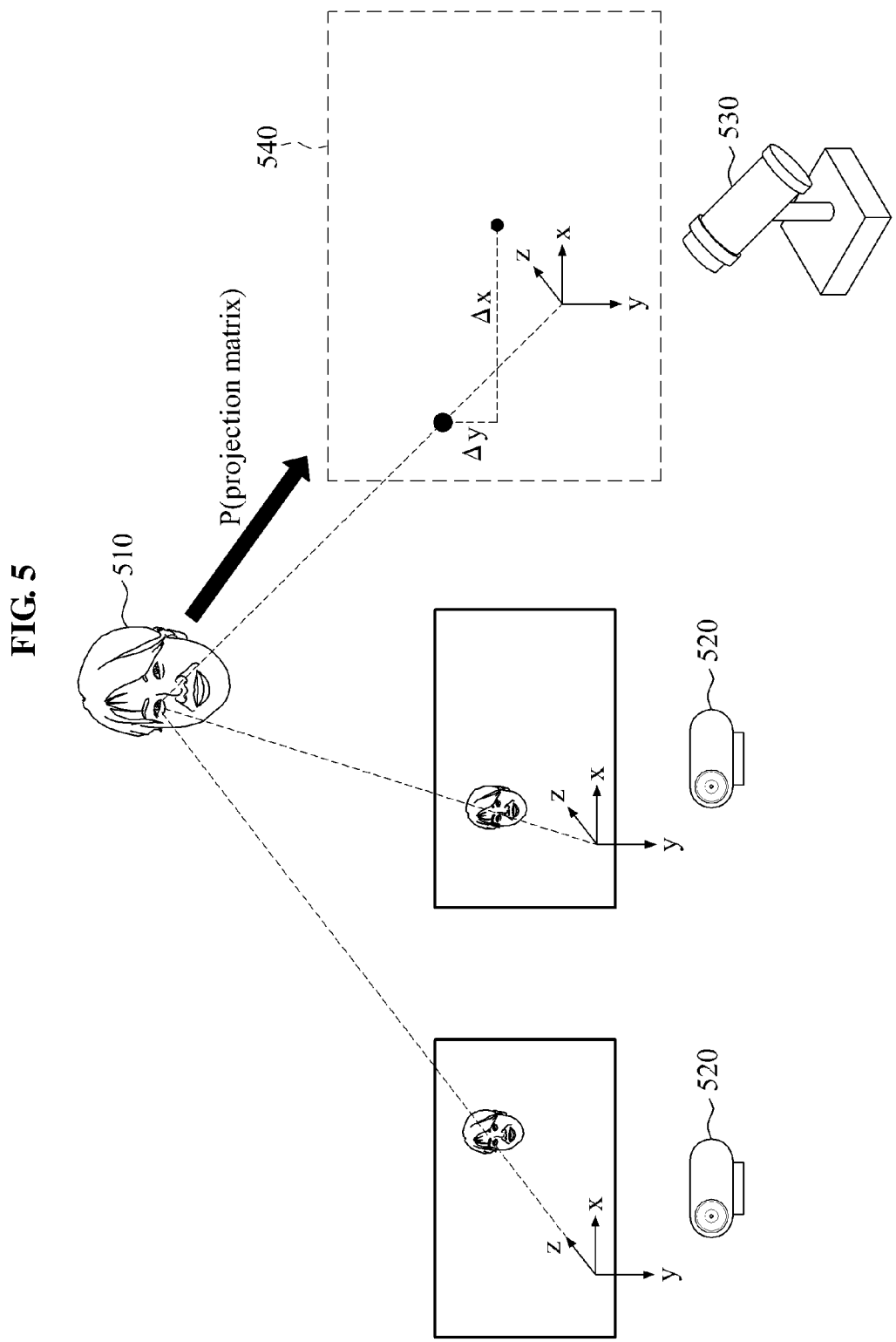
FIG. 5 is a diagram illustrating a concept of a calibration method of two wide angle cameras and a narrow angle camera according to an embodiment of the present invention.

FIG. 5 is a diagram illustrating a concept of a calibration method of two wide angle cameras and a narrow angle camera according to an embodiment of the present invention.

Referring to FIG. 5, when a 3D position of a user 510 detected using the wide angle cameras 520 is received as input, a gaze tracking apparatus may estimate a pan angle and a tilt angle used to capture a corresponding object, namely the user 510, by the narrow angle camera 530.

Referring back to FIG. 3, the calibration performing unit 330 may calculate a pan angle and a tilt angle, using a first estimator, a second estimator, and a third estimator.

The first estimator may estimate two-dimensional (2D) coordinates of a virtual image corresponding to the pan angle and the tilt angle. The second estimator may estimate virtual coordinates obtained by reflecting 3D coordinates of the 3D position on the virtual image, based on a relative position relationship between the 2D coordinates and the 3D coordinates. The third estimator may estimate the pan angle and the tilt angle, based on the virtual coordinates.

To obtain a relationship between the 3D position of the user 510 and an angle in which the narrow angle camera 530 actually moves, the gaze tracking apparatus may convert a pan angle and a tilt angle of the narrow angle camera 530 to x and y coordinates of a 2D image, as shown in FIG. 5.

For example, when a direction in which a pan angle and a tilt angle are 0 degree is assumed to be a reference direction, the gaze tracking apparatus may generate a virtual image 540 that is perpendicular to the reference direction and that is spaced apart by 1. In this example, when movement from the virtual image 540 to an x-axis is assumed to depend on only the pan angle, and movement from the virtual image 540 to a y-axis is assumed to depend on only the tilt angle, the pan angle and the tilt angle may be converted to x, y axial coordinates of the virtual image 540, using the following Equation 1:

$$\Delta x = \tan(\theta_{pan})$$
$$\Delta y = -\frac{\tan(\theta_{tilt})}{\cos(\theta_{pan})}$$
[Equation 1]

The gaze tracking apparatus may detect 3D coordinates of an object, and 2D coordinates in the virtual image 540, using Equation 1, and may calculate a projection matrix between the 3D coordinates and the 2D coordinates.

The gaze tracking apparatus may estimate, using the projection matrix, virtual coordinates ($x_v$, $y_v$) in which predetermined 3D coordinates are formed in the virtual image 540. According to an embodiment of the present invention, when the virtual coordinates are substituted in Equation 2 shown below, a pan angle and a tilt angle of the narrow angle camera 530 used to capture corresponding 3D coordinates may be estimated.

$$\theta_{pan} = \arctan(x_v)$$
$$\theta_{tilt} = \arctan\left(-\frac{y_v}{\sqrt{x_v^2 + 1}}\right)$$
[Equation 2]

Referring back to FIG. 3, the calibration performing unit 330 may perform calibration between the narrow angle camera 320 and the image playback apparatus. For example, the calibration performing unit 330 may estimate a difference with an actual position of the image playback apparatus based on a center of a tilt axis and a pan axis in which the narrow angle camera 320 moves.

When calibration is terminated, the gaze tracking apparatus may search for an eye of an actual user, and may track an eye gaze of the user using the narrow angle camera 320.

For example, to calculate user position information, the image acquiring unit 340 may detect a facial region using a Haar-like based Adaboost scheme in the two wide angle cameras 310, and may detect an eye region using the Haar-like based Adaboost scheme. The gaze tracking apparatus may estimate 3D coordinates of a left eye using coordinates and a disparity of the left eye, may apply the 3D coordinates to the projection matrix, and may estimate the pan angle and tilt angle of the narrow angle camera 320.

Figure 6:
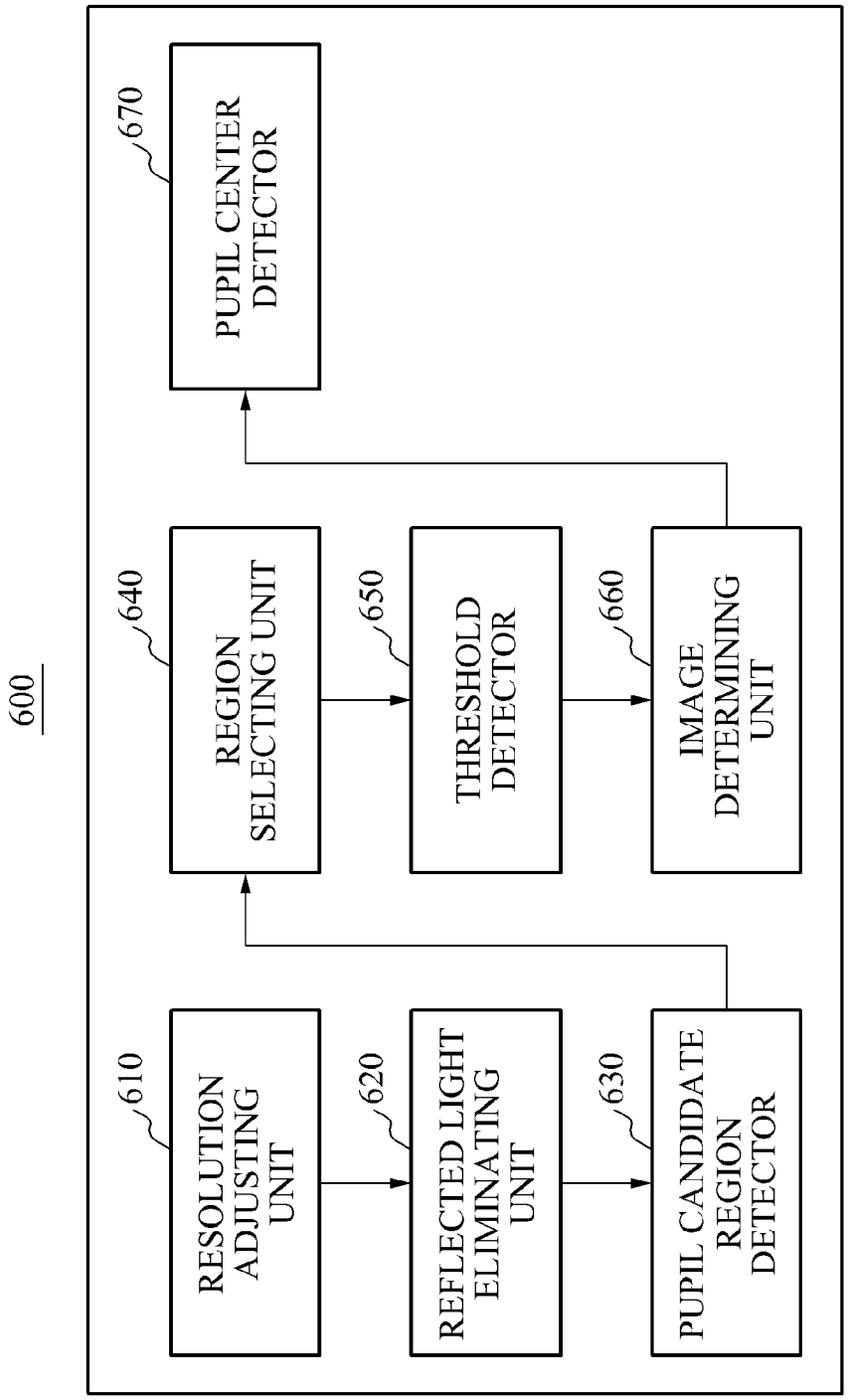
FIG. 6 is a block diagram illustrating a configuration of an image acquiring unit according to an embodiment of the present invention.

FIG. 6 is a block diagram illustrating a configuration of an image acquiring unit 600 according to an embodiment of the present invention.

Referring to FIG. 6, the image acquiring unit 600 may include a resolution adjusting unit 610, a reflected light eliminating unit 620, a pupil candidate region detector 630, a region selecting unit 640, a threshold detector 650, an image determining unit 660, and a pupil center detector 670.

The resolution adjusting unit 610 may adjust a resolution of input image information (*an input image. The reflected light eliminating unit 620 may eliminate reflected light of the image information with the adjusted resolution. The pupil candidate region detector 630 may detect a pupil candidate region by applying a preset filter to the image information from which the reflected light is eliminated.

FIG. 7 is a diagram illustrating an example of elimination of reflected light according to an embodiment of the present invention.

Referring to FIGS. 6 and 7, to detect a pupil candidate region from an eye image captured by a narrow angle camera, the image acquiring unit 600 may reduce, in size, a left image of FIG. 7 with a resolution of 1600×1200 to a right image with a resolution of 200×100, and may eliminate a reflected light region through a grayscale morphology operation.

Figure 9:
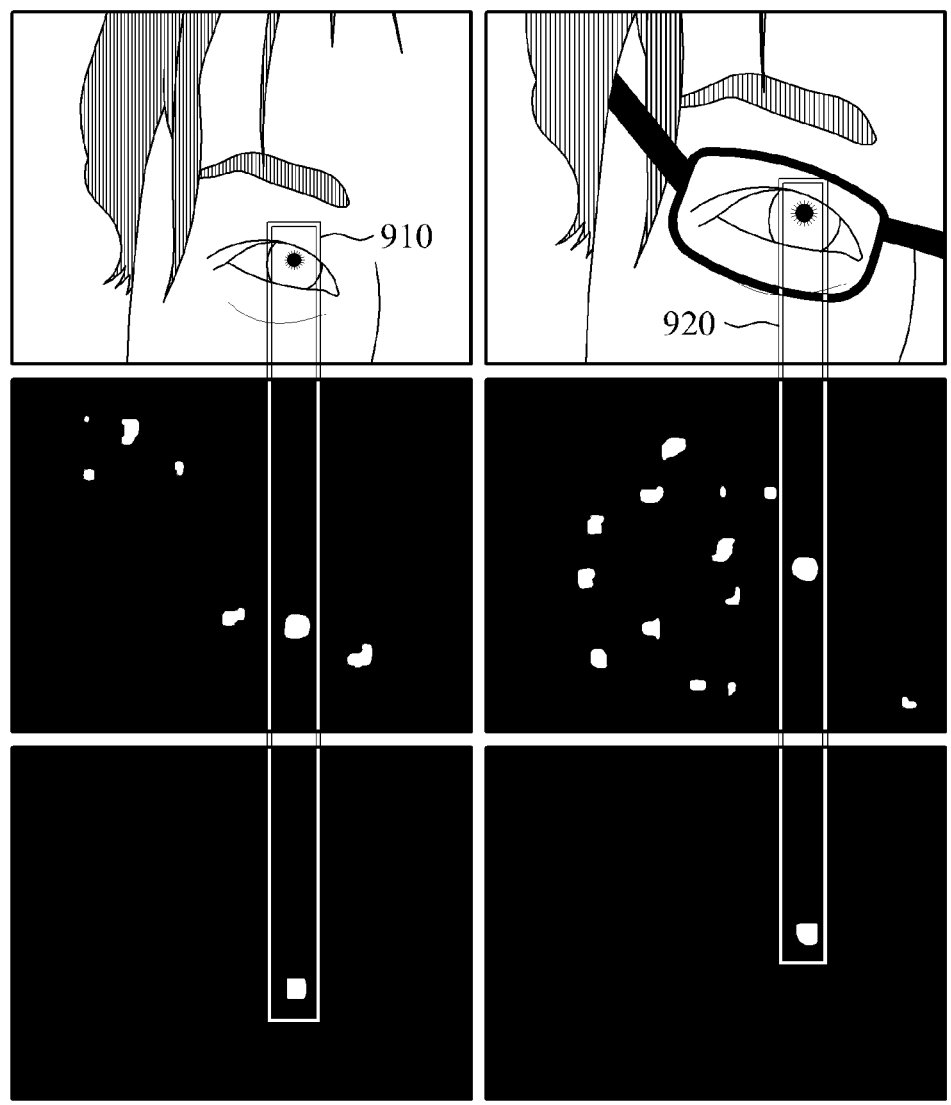
FIG. 9 is a diagram illustrating an example of a result obtained by detecting a pupil candidate region according to an embodiment of the present invention.

FIG. 8 is a diagram illustrating an example of applying a detection filter for a pupil candidate region according to an embodiment of the present invention, and FIG. 9 is a diagram illustrating an example of a result obtained by detecting a pupil candidate region according to an embodiment of the present invention.

Referring FIGS. 8 and 9, to detect a pupil candidate region from an image from which reflected light is eliminated, a gaze tracking apparatus may apply a filter, as shown in FIG. 8. For example, the pupil candidate region detector 630 of FIG. 6 may detect a pupil candidate region by applying a filter algorithm of Equation 3 given below, to image information from which reflected light is eliminated, and pupil candidate regions 910 and 920 of FIG. 9 may be obtained.

$$O(c) = \begin{cases} 1 & \text{if } I(b_i) > I(c) + d \text{ for all } i \\ 0 & \text{otherwise} \end{cases}$$
$$d = (\text{mean}(I) - \min(I))/32$$
[Equation 3]

In Equation 3, I denotes an intensity of an image, c denotes a center of a filter, O(c) denotes a result value of an equation in the center c, $b_i$ denotes a position of a peripheral portion of the filter, and d denotes a variable used to remove noise.

A middle image of FIG. 9 shows a result obtained when a parameter d is not applied, and a bottom image of FIG. 9 shows a result obtained when the parameter d is applied. The gaze tracking apparatus may detect a stable pupil candidate region, regardless of whether a user wears glasses, as shown in FIG. 9.

When a pupil candidate region is detected, the gaze tracking apparatus may estimate whether a pupil region is covered by an eyelid, to prevent an error from occurring in a gaze tracking result since the pupil region is covered by the eyelid.

Referring back to FIG. 6, the region selecting unit 640 may select two regions with different sizes from the pupil candidate region. The threshold detector 650 may detect two thresholds of the two regions. When the two thresholds are determined to be the same, the image determining unit 660 may determine that an eyelid image is not included in an eye image.

Figure 11:
FIG. 11 is a diagram illustrating a result obtained by applying an Otsu's thresholding method to a pupil candidate region according to an embodiment of the present invention.

FIG. 10 is a diagram illustrating an example of a large candidate region and a small candidate region adjacent to a pupil according to an embodiment of the present invention, and FIG. 11 is a diagram illustrating a result obtained by applying an Otsu's thresholding method to a pupil candidate region according to an embodiment of the present invention.

As shown in FIG. 10, a gaze tracking apparatus may select two regions with different sizes from a pupil candidate region.

The gaze tracking apparatus may distinguish the two regions by applying the Otsu's thresholding method to two images of FIG. 10, may obtain result images shown in FIG. 11, and may detect two thresholds. When the two thresholds are the same, the gaze tracking apparatus may determine that an eyelid is not shown in an image. When the two thresholds are different from each other, the gaze tracking apparatus may determine that an eyelid region exists.

Referring back to FIG. 6, the pupil center detector 670 may detect circle information from the pupil candidate region, may perform ellipse fitting on the detected circle information, and may detect pupil center information.

Figure 12:
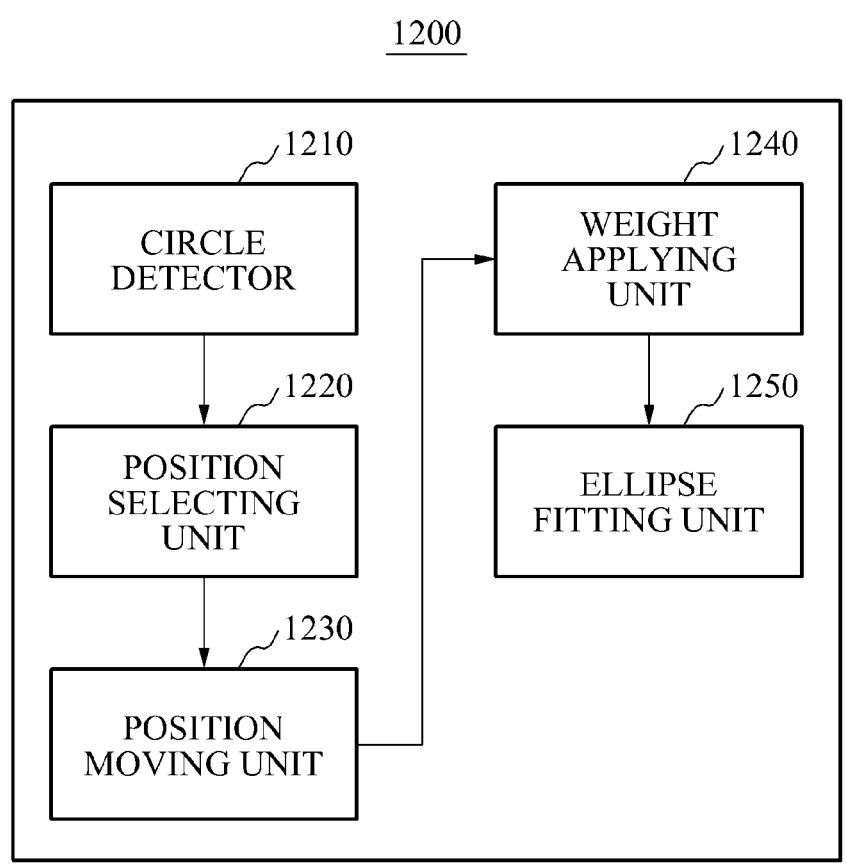
FIG. 12 is a block diagram illustrating, in detail, a configuration of a pupil center detector according to an embodiment of the present invention.

FIG. 12 is a block diagram illustrating, in detail, a configuration of a pupil center detector 1200 according to an embodiment of the present invention.

Referring to FIG. 12, the pupil center detector 1200 may include a circle detector 1210, a position selecting unit 1220, a position moving unit 1230, a weight applying unit 1240, and an ellipse fitting unit 1250.

The circle detector 1210 may distinguish a center of a circle from an outline of the circle by applying a circle detection scheme, in a pupil candidate region. The position selecting unit 1220 may select a plurality of points for the outline of the circle. The position moving unit 1230 may move the plurality of selected points to a position with a largest differential value for an intensity value in a straight line connecting the plurality of selected points to the center of the circle. The weight applying unit 1240 may apply a weight to the plurality of moved points, based on a differential value. The ellipse fitting unit 1250 may perform ellipse fitting using the plurality of points to which the weight is applied, and may detect pupil center information.

For example, the pupil center detector 1200 may distinguish a center of a circle from an outline of the circle, by applying a circle detection scheme to a detected pupil region, and may select 40 positions (*points for the outline of the circle. The gaze tracking apparatus (*pupil center detector 1200 may draw a straight line from 40 points to the center of the circle, may obtain a primary differentiation for an intensity value in the straight line, and may move 40 points to a position with a largest differential value.

The pupil center detector 1200 may ignore points of portions over an eyelid region that are obtained in advance, among 40 points that are moved, and may use a position that is initially obtained using the circle detection scheme, without a change. A weight may be applied to each of moved points based on a primary differential value. For example, as a primary differential value increases, a weight may increase.

The pupil center detector 1200 may perform ellipse fitting using 40 points to which the weight is applied. Since there is no concept of weight during the ellipse fitting, an effect of weighting during the ellipse fitting may be derived by increasing a number of points with high weights.

Figure 13:
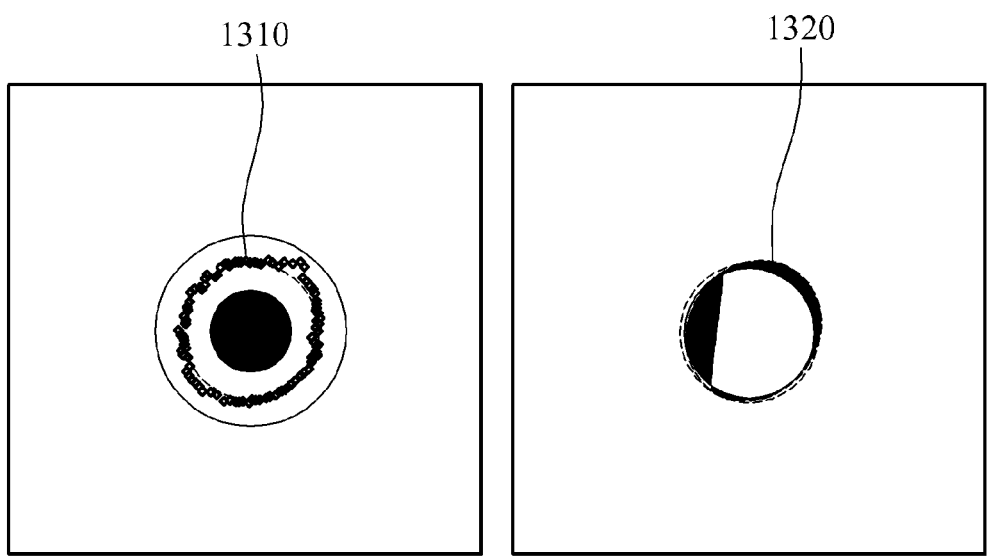
FIG. 13 is a diagram illustrating a configuration of points for ellipse fitting, and an ellipse fitting result according to an embodiment of the present invention.

FIG. 13 is a diagram illustrating a configuration of points for ellipse fitting, and an ellipse fitting result according to an embodiment of the present invention.

Referring to FIG. 13, a gaze tracking apparatus may determine that points for ellipse fitting are placed outside an outline 1310 of a circle, and that a pupil region is more accurately represented by an ellipse 1320 as a result of ellipse fitting, as shown in a right image of FIG. 13.

To obtain an eye gaze of a user, a center of a pupil and a center of reflected light may be detected from an image captured by a narrow angle camera, and a vector connecting the center of the pupil and the center of the reflected light may be detected. When a user sequentially gazes at six points displayed on a screen during user calibration, a 2D mapping function between the vector connecting the center of the pupil and the center of the reflected light and a pixel unit position of the six points may be calculated. When the user gazes at a predetermined position on a screen, an eye gaze position of the user may be detected using the 2D mapping function and the vector connecting the center of the pupil and the center of the reflected light.

According to an embodiment of the present invention, a gaze tracking apparatus may perform modeling of a change in a TV screen based on a position of a user, in a forward motion correction model that is used to correct an eye gaze position based on a movement of the user.

Figure 14:
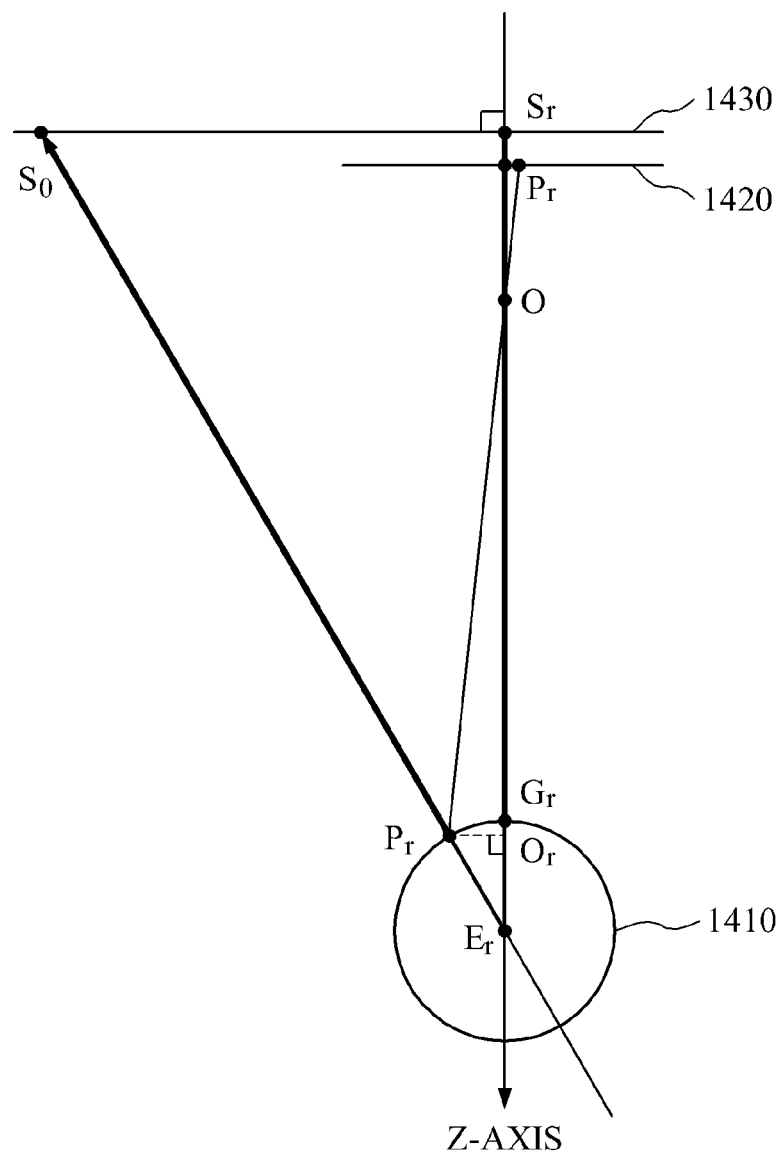
FIGS. 14 and 15 are diagrams illustrating examples of a relationship between a screen of an image playback apparatus, a narrow angle camera, and a pupil, based on movement of a user according to an embodiment of the present invention.
Figure 15:
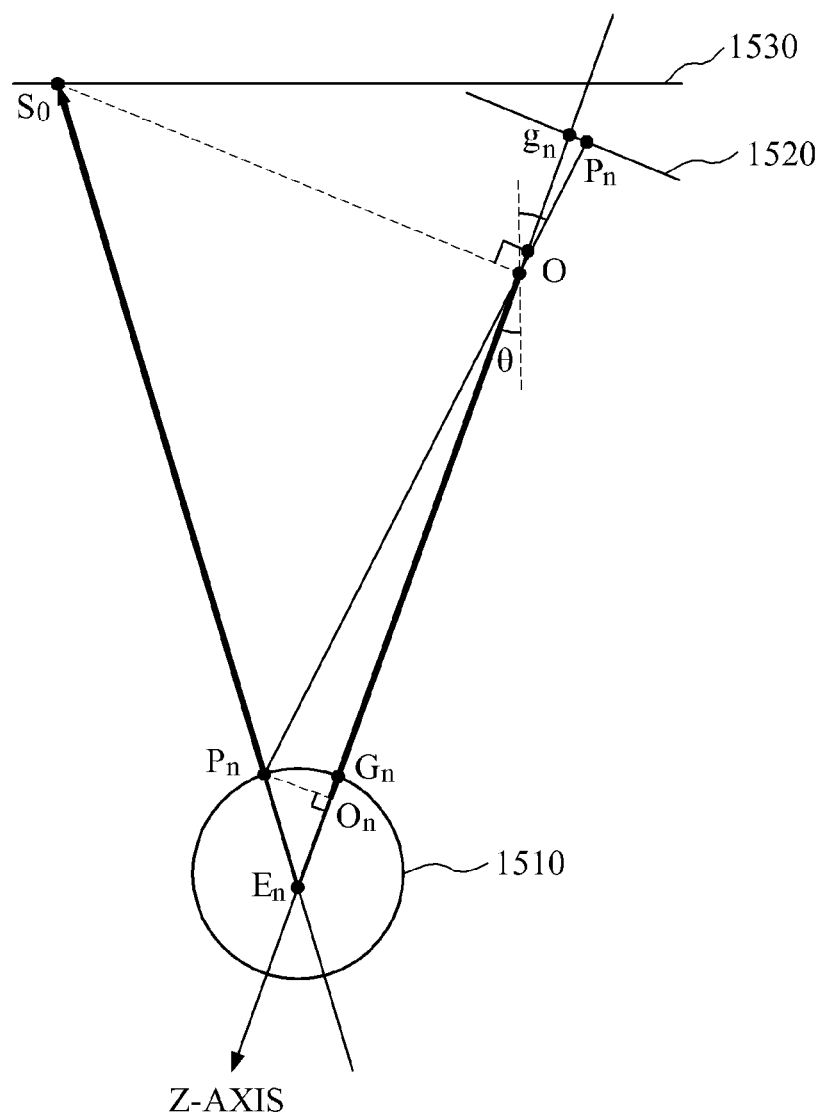

FIGS. 14 and 15 are diagrams illustrating examples of a relationship between a screen of an image playback apparatus, a narrow angle camera, and a pupil, based on movement of a user according to an embodiment of the present invention.

FIG. 14 illustrates an example in which, when a user is located in a center of a screen 1430 of an image playback apparatus, the screen 1430 is parallel to an image sensor 1420 of a narrow angle camera, and a center of a pupil 1410 of the user is perpendicular to the screen 1430 and the image sensor 1420. In an example in which an infrared lighting is assumed to be placed in the same position as the narrow angle camera, when the user gazes at a specific position on a screen during user calibration, a gaze tracking apparatus may obtain vector components as shown in Equation 4 below.

$$\overrightarrow{g_rP_r} = (v_{xr}, v_{yr})$$

$$\overrightarrow{P_rQ_r} = (V_{xr}, V_{yr})$$

$$\overrightarrow{S_rS_0} = (D_{xr}, D_{yr})$$

$$V_{xr}/\|\overrightarrow{OQ_r}\| = -v_{xr}/f \qquad \text{[Equation 4]}$$

FIG. 15 illustrates an example of a relationship between a screen 1530 of an image playback apparatus, an image sensor 1520 of a narrow angle camera, and a pupil 1510 of a user, when the user moves. A gaze tracking apparatus may obtain vector components as shown in Equation 5 below, based on FIG. 15.

$$\overrightarrow{g_nP_n} = (v_{xn}, v_{yn})$$

$$\overrightarrow{P_nQ_n} = (V_{xn}, V_{yn})$$

$$\overrightarrow{S_nS_0} = (D_{xn}, D_{yn})$$

$$V_{xn}/\|\overrightarrow{OQ_n}\| = -v_{xn}/f \qquad \text{[Equation 5]}$$

According to an embodiment of the present invention, the vector components of Equations 4 and 5 may be summarized as shown in Equation 6 below.

$$v_{xn} = (\|\overrightarrow{oQ_r}\|/\|\overrightarrow{oQ_n}\|) * (V_{xn}/V_{xr}) * v_{xr} \quad [\text{Equation 6}]$$

Additionally, the gaze tracking apparatus may compute a relationship between vector components, as shown in Equation 7 below, based on FIGS. 14 and 15 and Equations 4 and 5, and may compute a value of Equation 8 through operations of Equations 6 and 7.

$$D_{xr}/\|\overrightarrow{E_rS_r}\| = V_{xr}/\|\overrightarrow{E_rQ_r}\| \quad [\text{Equation 7}]$$

$$D_{xn}/\|\overrightarrow{E_nS_n}\| = V_{xn}/\|\overrightarrow{E_nQ_n}\|$$

$$v_{xn} = \frac{\|\overrightarrow{OQ_r}\|}{\|\overrightarrow{OQ_n}\|} \frac{D_{xn}}{D_{xr}} \frac{\|\overrightarrow{E_nQ_n}\|}{\|\overrightarrow{E_rQ_r}\|} \frac{\|\overrightarrow{E_rS_r}\|}{\|\overrightarrow{E_nS_n}\|} v_{xr} \quad [\text{Equation 8}]$$

Furthermore, the gaze tracking apparatus may compute a relationship between vector components, as shown in Equation 7 (*9 below, based on FIGS. 14 and 15 and Equations 4 and 5, and may compute a value of Equation 10 through operations of Equations 8 and 9.

$$\|\overrightarrow{E_rP_r}\|/\|\overrightarrow{E_rQ_r}\| = \|\overrightarrow{E_rS_0}\|/\|\overrightarrow{E_rS_r}\| \quad [\text{Equation 9}]$$

$$\|\overrightarrow{E_nP_n}\|/\|\overrightarrow{E_nQ_n}\| = \|\overrightarrow{E_nS_0}\|/\|\overrightarrow{E_nS_n}\|$$

$$v_{xn} = \frac{\|\overrightarrow{OQ_r}\|}{\|\overrightarrow{OQ_n}\|} \frac{D_{xn}}{D_{xr}} \frac{\|\overrightarrow{E_rS_0}\|}{\|\overrightarrow{E_nS_0}\|} v_{xr} \quad [\text{Equation 10}]$$

$$= k_x(v_{xr})$$

$$v_{yn} = \frac{\|\overrightarrow{OQ_r}\|}{\|\overrightarrow{OQ_n}\|} \frac{D_{yn}}{D_{yr}} \frac{\|\overrightarrow{E_rS_0}\|}{\|\overrightarrow{E_nS_0}\|} v_{yr}$$

$$= k_y(v_{yr})$$

The gaze tracking apparatus may estimate 3D positions of centers $E_r$ and $E_n$ of pupils of a user, using a wide angle stereo camera, as shown in Equation 11 below.

$$E_r = (x_r, y_r, z_r)$$

$$E_n = (x_n, y_n, z_n) \quad [\text{Equation 11}]$$

The gaze tracking apparatus may obtain a distance from an optical center O of a narrow angle camera to the centers $E_r$ and $E_n$. For example, the gaze tracking apparatus may use a projection matrix "P=K[R|t]" as a result of pan/tilt calibration, to obtain the distance from the optical center O to the centers $E_r$ and $E_n$, as shown in Equation 12 below.

$$\|\overrightarrow{OE_r}\| = \|R(x_r, y_r, z_r)^T + t\| \cong \|\overrightarrow{OQ_r}\| \quad [\text{Equation 12}]$$

$$\|\overrightarrow{OE_n}\| = \|R(x_n, y_n, z_n)^T + t\| \cong \|\overrightarrow{OQ_n}\|$$

$$v_{xn} = \frac{\|\overrightarrow{OQ_r}\|}{\|\overrightarrow{OQ_n}\|} \frac{D_{xn}}{D_{xr}} \frac{\|\overrightarrow{E_rS_0}\|}{\|\overrightarrow{E_nS_0}\|} v_{xr}$$

$$= k_x(v_{xr})$$

$$v_{yn} = \frac{\|\overrightarrow{OQ_r}\|}{\|\overrightarrow{OQ_n}\|} \frac{D_{yn}}{D_{yr}} \frac{\|\overrightarrow{E_rS_0}\|}{\|\overrightarrow{E_nS_0}\|} v_{yr}$$

$$= k_y(v_{yr})$$

In Equation 12, T and t denote matrix transpose and a translation vector, respectively, and R denotes a rotation matrix. Additionally, a component, such as $D_{xr}$, $D_{yr}$, $\|\overrightarrow{OS_r}\|$, and the like may be measured directly by a user using a tapeline and the like.

Additionally, a position of $S_0$ based on the optical center O may be represented as $(D_{xr}, D_{yr}, -\|\overrightarrow{OS_r}\|)$. When rotation is performed by $\theta_p$ and $\theta_t$ by a pan/tilt module, an operation may be performed as shown in Equation 13.

$$(D_{xn}, D_{yn}, D_{zn})^T = R_t R_p (D_{xr}, D_{yr}, -\|\overrightarrow{OS_r}\|)^T \quad [\text{Equation 13}]$$

$$R_t = \begin{bmatrix} 1 & 0 & 0 \\ 0 & \cos\theta_t & -\sin\theta_t \\ 0 & \sin\theta_t & \cos\theta_t \end{bmatrix},$$

$$R_p = \begin{bmatrix} \cos\theta_p & 0 & \sin\theta_p \\ 0 & 1 & 0 \\ -\sin\theta_p & 0 & \cos\theta_p \end{bmatrix}$$

$$v_{xn} = \frac{\|\overrightarrow{OQ_r}\|}{\|\overrightarrow{OQ_n}\|} \frac{D_{xn}}{D_{xr}} \frac{\|\overrightarrow{E_rS_0}\|}{\|\overrightarrow{E_nS_0}\|} v_{xr}$$

$$= k_x(v_{xr})$$

$$v_{yn} = \frac{\|\overrightarrow{OQ_r}\|}{\|\overrightarrow{OQ_n}\|} \frac{D_{yn}}{D_{yr}} \frac{\|\overrightarrow{E_rS_0}\|}{\|\overrightarrow{E_nS_0}\|} v_{yr}$$

$$= k_y(v_{yr})$$

The gaze tracking apparatus may obtain a value of $\|\overrightarrow{E_rS_0}\|$ and a value of $\|\overrightarrow{E_nS_0}\|$, based on Equation 13, as shown in Equation 14 below.

$$\|\overrightarrow{E_rS_0}\| = \sqrt{D_{xr}^2 + D_{yr}^2 + (\|\overrightarrow{OE_r}\| + \|\overrightarrow{OS_r}\|)^2}$$

$$\|\overrightarrow{E_nS_0}\| = \sqrt{D_{xn}^2 + D_{yn}^2 + (\|\overrightarrow{OE_n}\| - D_{xn})^2} \quad [\text{Equation 14}]$$

Finally, the gaze tracking apparatus may obtain a value of $v_{xn}$ and a value of $v_{yn}$, based on the above-described Equations 4 through 14, as shown in Equation 15 below.

$$v_{xn} = \frac{\|\overrightarrow{OQ_r}\|}{\|\overrightarrow{OQ_n}\|} \frac{D_{xn}}{D_{xr}} \frac{\|\overrightarrow{E_rS_0}\|}{\|\overrightarrow{E_nS_0}\|} v_{xr} \quad [\text{Equation 15}]$$

$$= k_x(v_{xr})$$

$$v_{yn} = \frac{\|\overrightarrow{OQ_r}\|}{\|\overrightarrow{OQ_n}\|} \frac{D_{yn}}{D_{yr}} \frac{\|\overrightarrow{E_rS_0}\|}{\|\overrightarrow{E_nS_0}\|} v_{yr}$$

$$= k_y(v_{yr})$$

To obtain an accurate eye gaze position, the gaze tracking apparatus may perform a process that will be described with reference to FIG. 16, since a user requires panning and tilting during user calibration.

Figure 16:
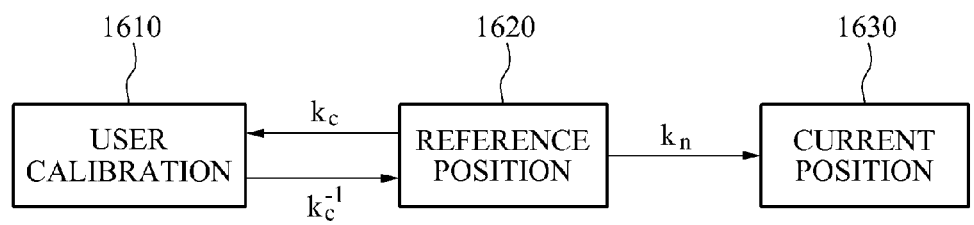
FIG. 16 is a diagram illustrating a relationship between a user calibration position, a reference position, and a current position according to an embodiment of the present invention.

FIG. 16 is a diagram illustrating a relationship between a user calibration position, a reference position, and a current position according to an embodiment of the present invention.

Referring to FIG. 16, a gaze tracking apparatus may obtain a reference position 1620 in a user calibration position 1610 in which user calibration is performed, and may obtain a current position 1630 based on the reference position 1620. For example, the gaze tracking apparatus may convert a pupil center corneal reflection (PCCR) vector estimated from the user calibration position 1610 to a PCCR vector of the current position 1630, and may obtain values shown in Equation 16 below.

$$v_{xn} = h_x(v_{xc})$$
$$= k_{xn}(k_{xc}^{-1}(v_{xc}))$$
$$= \frac{\|\overrightarrow{OQ_c}\|}{\|\overrightarrow{OQ_n}\|} \frac{D_{xn}}{D_{xc}} \frac{\|\overrightarrow{E_cS_0}\|}{\|\overrightarrow{E_nS_0}\|} v_{xc}$$
$$v_{yn} = h_y(v_{yc})$$
$$= k_{yn}(k_{yc}^{-1}(v_{yc}))$$
$$= \frac{\|\overrightarrow{OQ_c}\|}{\|\overrightarrow{OQ_n}\|} \frac{D_{yn}}{D_{yc}} \frac{\|\overrightarrow{E_cS_0}\|}{\|\overrightarrow{E_nS_0}\|} v_{yc}$$
[Equation 16]

In Equation 16, variables subscripted with c among the variables may refer to values in a calibration position.

The gaze tracking apparatus may provide a process of correcting a gaze tracking result, in preparation for shaking caused by a shaken pupil and image noise even when a user gazes at the same position.

The gaze tracking apparatus may further include an image correcting unit to correct an error in gaze position information that is caused by a shaken pupil of a user. The image correcting unit may correct the gaze position information using Equation 9.

For example, when a gaze tracking position detected from a current image, and a gaze tracking position detected from a previous image are assumed to be "v(t)={x, y}", and "v'(t−1)," respectively, a corrected gaze tracking position may be defined as shown in Equation 17 below. In Equation 17, a parameter W may correspond to a parameter indicating whether to use an original value without correction by determining that an eye gaze of a user is moved when two eye gaze positions are spaced apart from each other by a predetermined distance.

$$v'(t) = \alpha v(t) + (1 - \alpha)v'(t-1)$$
$$\alpha = \begin{cases} 1 & \text{if } \left\|\frac{v(t) - v'(t-1)}{1920}\right\| > W \\ \left\|\frac{v(t) - v'(t-1)}{1920}\right\| & \text{otherwise} \end{cases}$$
[Equation 17]

In Equation 17, v'(t) may correspond to the corrected gaze position information, v(t) may correspond to a gaze tracking position detected from a current image, v'(t−1) may correspond to a gaze tracking position corrected in a previous image, and W may correspond to a boundary value of a difference in a distance between a current eye gaze position and a previous eye gaze position.

FIG. 17 is a flowchart illustrating a gaze tracking method according to an embodiment of the present invention.

Referring to FIG. 17, a gaze tracking apparatus may perform calibration between wide angle cameras in operation 1701, may perform calibration between the wide angle cameras and a narrow angle camera in operation 1702, and may perform calibration between an image playback apparatus and the narrow angle camera in operation 1703. In operation 1704, the gaze tracking apparatus may perform user calibration.

The gaze tracking apparatus may receive an image from the wide angle cameras in operation 1705, and may detect a facial region for each dual camera image in operation 1706.

In operation 1707, the gaze tracking apparatus may detect an eye region, and may calculate a 3D position of a user. In operation 1708, the gaze tracking apparatus may calculate pan, tilt, and focus values, based on user position information and eye region detection information, using the narrow angle camera. In operation 1709, the gaze tracking apparatus may perform panning, tilting, and focusing, based on the calculated pan, tilt, and focus values.

In operation 1710, the gaze tracking apparatus may acquire an eye image through an operation of the narrow angle camera. In operations 1711 and 1712, the gaze tracking apparatus may detect pupil center information and corneal reflected light information from the eye image.

In operation 1713, the gaze tracking apparatus may calculate gaze position information from the pupil center information and the corneal reflected light information, using eye position information and a forward motion corresponding model.

According to an embodiment of the present invention, it is possible to track an eye gaze at a distance, using a narrow angle camera. Additionally, it is possible to track an eye gaze, even when a user moves from a position in which user calibration is performed.

The above-described embodiments of the present invention may be recorded in non-transitory computer-readable media including program instructions to implement various operations embodied by a computer. The media may also include, alone or in combination with the program instructions, data files, data structures, and the like. The program instructions recorded on the media may be those specially designed and constructed for the purposes of the embodiments, or they may be of the kind well-known and available to those having skill in the computer software arts. Examples of non-transitory computer-readable media include magnetic media such as hard disks, floppy disks, and magnetic tape; optical media such as CD ROM disks and DVDs; magneto-optical media such as optical discs; and hardware devices that are specially configured to store and perform program instructions, such as read-only memory (ROM), random access memory (RAM), flash memory, and the like. Examples of program instructions include both machine code, such as produced by a compiler, and files containing higher level code that may be executed by the computer using an interpreter. The described hardware devices may be configured to act as one or more software modules in order to perform the operations of the above-described embodiments of the present invention, or vice versa.

Although a few exemplary embodiments of the present invention have been shown and described, the present invention is not limited to the described exemplary embodiments. Instead, it would be appreciated by those skilled in the art that changes may be made to these exemplary embodiments without departing from the principles and spirit of the invention, the scope of which is defined by the claims and their equivalents.

What is claimed is:
1. A gaze tracking apparatus, comprising:
a calibration performing unit to perform calibration between at least two wide angle cameras, a narrow angle camera, and an image playback apparatus, and to calculate user position information associated with a user;

an image information input unit to receive input of image information through the at least two wide angle cameras;

a first information detector to detect eye position information from the image information;

an image acquiring unit to acquire an eye image by performing panning, tilting, and focusing of the narrow angle camera, based on the eye position information and the user position information;

a second information detector to detect pupil center information regarding a center of a pupil from the eye image;

a third information detector to detect corneal reflected light information regarding corneal reflected light reflected from an eye of the user; and a gaze position calculating unit to calculate gaze position information from the pupil center information and the corneal reflected light information, wherein the image acquiring unit detects a pupil candidate region by applying a filter algorithm to the image information from which a reflected light is eliminated.

2. The gaze tracking apparatus of claim 1, wherein the calibration performing unit performs calibration between the at least two wide angle cameras, performs calibration between the at least two wide angle cameras and the narrow angle camera, and performs calibration between the narrow angle camera and the image playback apparatus.

3. The gaze tracking apparatus of claim 1, wherein the first information detector detects a facial region and an eye region, based on at least two pieces of image information.

4. The gaze tracking apparatus of claim 1, wherein, when the user moves from a position in which calibration is performed between the at least two wide angle cameras, the gaze position calculating unit corrects the user position information by applying the user position information to a forward motion correction model, and calculates the gaze position information based on the corrected user position information.

5. A gaze tracking apparatus, comprising:
at least two wide angle cameras to receive input of image information, and to calculate user position information associated with a user through calibration;

a narrow angle camera to perform panning, tilting, and focusing, using the user position information and eye region detection information;

an image acquiring unit to acquire an eye image through an operation of the narrow angle camera;

a detector to detect pupil center information and corneal reflected light information from the eye image; and a gaze position calculating unit to calculate gaze position information from the pupil center information and the corneal reflected light information, wherein the image acquiring unit detects a pupil candidate region by applying a filter algorithm to the image information from which a reflected light is eliminated.

6. The gaze tracking apparatus of claim 5, further comprising:

a calibration performing unit to perform calibration between the at least two wide angle cameras.

7. The gaze tracking apparatus of claim 6, wherein the calibration performing unit estimates, based on a wide angle camera, a degree of rotation and a position of another camera using a stereo calibration scheme.

8. The gaze tracking apparatus of claim 5, wherein the calibration performing unit performs calibration between the at least two wide angle cameras and the narrow angle camera.

9. The gaze tracking apparatus of claim 5, wherein the calibration performing unit performs calibration between the narrow angle camera and an image playback apparatus.

10. The gaze tracking apparatus of claim 9, wherein the calibration performing unit estimates a difference with an actual position of the image playback apparatus based on a center of a tilt axis and a pan axis in which the narrow angle camera moves.

11. The gaze tracking apparatus of claim 1, wherein, the filter algorithm being represented by the following Equation 1:

$$O(c) = \begin{cases} 1 & \text{if } I(b_i) > I(c) + d \text{ for all } i \\ 0 & \text{otherwise} \end{cases} \quad [\text{Equation 1}]$$

$$d = (\text{mean}(I) - \min(I))/32$$

wherein I denotes an intensity of an image, c denotes a center of a filter, O(c) denotes a result value of an equation in the center c, bi denotes a position of a peripheral portion of the filter, and d denotes a variable used to remove noise.

12. The gaze tracking apparatus of claim 5, wherein the image acquiring unit calculates a pan angle and a tilt angle used to capture the user using the narrow angle camera, based on a three-dimensional (3D) position of the user.

13. The gaze tracking apparatus of claim 12, wherein the image acquiring unit comprises:

a first estimator to estimate two-dimensional (2D) coordinates of a virtual image corresponding to the pan angle and the tilt angle;

a second estimator to estimate virtual coordinates obtained by reflecting 3D coordinates of the 3D position on the virtual image, based on a relative position relationship between the 2D coordinates and the 3D coordinates; and a third estimator to estimate the pan angle and the tilt angle, based on the virtual coordinates.

14. The gaze tracking apparatus of claim 5, wherein the gaze position calculating unit calculates the gaze position information through a forward motion correction model used to correct an eye gaze position based on movement of the user.

* * * * *